US009167301B2

(12) United States Patent  
Koch et al.

(10) Patent No.: US 9,167,301 B2  
(45) Date of Patent: Oct. 20, 2015

(54) METHODS AND COMPUTER PROGRAM PRODUCTS FOR TAKING A SECONDARY ACTION RESPONSIVE TO RECEIPT OF AN ADVERTISEMENT

(75) Inventors: Robert Koch, Norcross, GA (US); Dale Malik, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1374 days.

(21) Appl. No.: 11/254,317

(22) Filed: Oct. 20, 2005

(65) Prior Publication Data

US 2006/0075426 A1    Apr. 6, 2006

Related U.S. Application Data

(63) Continuation-in-part of application No. 10/958,813, filed on Oct. 5, 2004.

(51) Int. Cl.

| | | |
|---|---|---|
| H04N 21/414 | (2011.01) |
| H04N 21/488 | (2011.01) |
| H04N 21/431 | (2011.01) |
| H04N 21/462 | (2011.01) |
| G06Q 30/02 | (2012.01) |
| H04N 21/235 | (2011.01) |
| H04N 21/41 | (2011.01) |
| H04N 21/435 | (2011.01) |
| H04N 21/436 | (2011.01) |
| H04N 21/4722 | (2011.01) |
| H04N 21/81 | (2011.01) |
| H04N 21/835 | (2011.01) |
| H04N 21/858 | (2011.01) |

(52) U.S. Cl.

CPC ........... *H04N 21/4622* (2013.01); *G06Q 30/02* (2013.01); *H04N 21/235* (2013.01); *H04N 21/4126* (2013.01); *H04N 21/41422* (2013.01); *H04N 21/435* (2013.01); *H04N 21/4312* (2013.01); *H04N 21/4316* (2013.01); *H04N 21/43622* (2013.01); *H04N 21/4722* (2013.01); *H04N 21/4882* (2013.01); *H04N 21/812* (2013.01); *H04N 21/835* (2013.01); *H04N 21/8586* (2013.01)

(58) Field of Classification Search

USPC .............................. 725/135, 60, 58  
See application file for complete search history.

(56) References Cited

U.S. PATENT DOCUMENTS

| 5,488,409 A * | 1/1996 | Yuen et al. ..................... 725/41 |
| 5,699,107 A | 12/1997 | Lawler et al. |
| 6,172,677 B1 | 1/2001 | Stautner et al. |
| 6,177,931 B1 | 1/2001 | Alexander et al. |
| 6,317,784 B1 | 11/2001 | Mackintosh et al. |
| 6,349,329 B1 | 2/2002 | Mackintosh et al. |
| 6,412,111 B1 * | 6/2002 | Cato .............................. 725/137 |
| 6,601,103 B1 | 7/2003 | Goldschmidt Iki et al. |
| 6,678,892 B1 | 1/2004 | Lavelle et al. |
| 6,701,355 B1 | 3/2004 | Brandt et al. |
| 6,771,290 B1 * | 8/2004 | Hoyle ........................... 715/745 |

(Continued)

*Primary Examiner* — Pankaj Kumar  
*Assistant Examiner* — Usha Raman  
(74) *Attorney, Agent, or Firm* — Cantor Colburn LLP

(57) ABSTRACT

A method for programming a secondary device responsive to an advertisement, including: requesting a file and associated content identifier responsive to the advertisement; receiving the advertisement and a supplementary information associated with the advertisement; presenting a user with an option to initiate a request for an activity in response to the supplementary information; and performing the requested activity in response to the user request.

10 Claims, 4 Drawing Sheets

(56) References Cited

U.S. PATENT DOCUMENTS

| | | |
|---|---|---|
| 6,782,550 B1 | 8/2004 | Cao |
| 6,871,356 B2 | 3/2005 | Chang |
| 6,904,609 B1 | 6/2005 | Pietraszak et al. |
| 6,928,654 B2 | 8/2005 | Tranchina et al. |
| 6,966,037 B2 * | 11/2005 | Fredriksson et al. ......... 715/830 |
| 6,973,669 B2 | 12/2005 | Daniels |
| 6,981,045 B1 | 12/2005 | Brooks |
| 6,996,390 B2 | 2/2006 | Herley et al. |
| 7,024,676 B1 | 4/2006 | Klopfenstein |
| 7,028,071 B1 | 4/2006 | Slik |
| 7,095,986 B2 | 8/2006 | Mager |
| 7,120,924 B1 | 10/2006 | Katcher et al. |
| 7,158,753 B2 | 1/2007 | Kagan et al. |
| 7,181,756 B1 | 2/2007 | Zigmond et al. |
| 7,188,186 B1 * | 3/2007 | Meyer et al. .................. 709/231 |
| 7,403,913 B2 | 7/2008 | Wood |
| 7,412,716 B2 | 8/2008 | Kikinis et al. |
| 7,444,353 B1 * | 10/2008 | Chen et al. ............................ 1/1 |
| 7,493,645 B1 | 2/2009 | Tranchina |
| 7,493,646 B2 | 2/2009 | Ellis |
| 7,603,683 B2 | 10/2009 | Reto |
| 7,673,315 B1 | 3/2010 | Wong et al. |
| 2001/0034705 A1 | 10/2001 | Rhoads |
| 2002/0002039 A1 * | 1/2002 | Qureshey et al. ............. 455/344 |
| 2002/0013851 A1 | 1/2002 | Crandall |
| 2002/0013950 A1 | 1/2002 | Tomsen |
| 2002/0016971 A1 | 2/2002 | Berezowski et al. |
| 2002/0049037 A1 * | 4/2002 | Christensen et al. ........ 455/3.06 |
| 2002/0059603 A1 | 5/2002 | Kelts |
| 2002/0059610 A1 | 5/2002 | Ellis |
| 2002/0082879 A1 | 6/2002 | Miller et al. |
| 2002/0104090 A1 | 8/2002 | Stettner |
| 2002/0120925 A1 | 8/2002 | Logan |
| 2002/0120936 A1 | 8/2002 | Del Beccaro et al. |
| 2002/0133819 A1 * | 9/2002 | Jackson .......................... 725/39 |
| 2002/0143645 A1 | 10/2002 | Odinak et al. |
| 2002/0144116 A1 | 10/2002 | Giobbi |
| 2002/0162118 A1 * | 10/2002 | Levy et al. ..................... 725/110 |
| 2002/0174430 A1 | 11/2002 | Ellis et al. |
| 2002/0174431 A1 * | 11/2002 | Bowman et al. ................ 725/47 |
| 2002/0174436 A1 | 11/2002 | Wu et al. |
| 2003/0018748 A1 | 1/2003 | McKenna, Jr. |
| 2003/0020744 A1 | 1/2003 | Ellis et al. |
| 2003/0056219 A1 | 3/2003 | Reichardt et al. |
| 2003/0066076 A1 | 4/2003 | Minahan |
| 2003/0149980 A1 | 8/2003 | Hassell et al. |
| 2003/0149988 A1 | 8/2003 | Ellis et al. |
| 2003/0154481 A1 | 8/2003 | Anderson et al. |
| 2003/0159150 A1 | 8/2003 | Chernock et al. |
| 2003/0220100 A1 * | 11/2003 | McElhatten et al. .......... 455/418 |
| 2004/0116088 A1 * | 6/2004 | Ellis et al. ..................... 455/132 |
| 2004/0117831 A1 | 6/2004 | Ellis et al. |
| 2004/0117845 A1 | 6/2004 | Karaoguz et al. |
| 2004/0128514 A1 * | 7/2004 | Rhoads ......................... 713/176 |
| 2004/0148424 A1 | 7/2004 | Berkson et al. |
| 2004/0153767 A1 | 8/2004 | Dolgonos |
| 2004/0165481 A1 * | 8/2004 | Ibric ................................. 369/6 |
| 2004/0177003 A1 * | 9/2004 | Liao et al. ....................... 705/14 |
| 2004/0203630 A1 | 10/2004 | Wang |
| 2004/0226051 A1 | 11/2004 | Carney et al. |
| 2005/0005298 A1 | 1/2005 | Tranchina |
| 2005/0020223 A1 * | 1/2005 | Ellis et al. .................. 455/186.1 |
| 2005/0028208 A1 * | 2/2005 | Ellis et al. ....................... 725/58 |
| 2005/0045373 A1 | 3/2005 | Born |
| 2005/0055730 A1 | 3/2005 | Daniels |
| 2005/0120858 A1 * | 6/2005 | Fitzgerald et al. .................. 84/1 |
| 2005/0202781 A1 * | 9/2005 | Steelberg et al. ............. 455/3.01 |
| 2005/0203992 A1 | 9/2005 | Tanaka et al. |
| 2005/0204388 A1 | 9/2005 | Knudson et al. |
| 2005/0210181 A1 * | 9/2005 | Depke et al. .................. 711/100 |
| 2005/0239402 A1 | 10/2005 | Gioscia et al. ............... 455/3.06 |
| 2005/0251455 A1 | 11/2005 | Boesen |
| 2005/0288999 A1 | 12/2005 | Lerner et al. |
| 2005/0289591 A1 * | 12/2005 | Vermola et al. .................. 725/45 |
| 2006/0008256 A1 | 1/2006 | Khedouri et al. |
| 2006/0029109 A1 * | 2/2006 | Moran .......................... 370/538 |
| 2006/0075427 A1 | 4/2006 | Koch et al. |
| 2006/0112409 A1 | 5/2006 | Yoon |
| 2006/0156346 A1 | 7/2006 | Kulakowski |
| 2006/0179077 A1 * | 8/2006 | Berstis et al. ............... 707/104.1 |
| 2006/0184969 A1 | 8/2006 | Yamamoto et al. |
| 2007/0135084 A1 | 6/2007 | Ido et al. |
| 2008/0184301 A1 * | 7/2008 | Boylan et al. ................... 725/40 |
| 2009/0158318 A1 * | 6/2009 | Levy ............................... 725/32 |
| 2010/0306792 A1 * | 12/2010 | Li et al. ........................... 725/23 |
| 2013/0073987 A1 * | 3/2013 | Nush ............................. 715/753 |

* cited by examiner

METHODS AND COMPUTER PROGRAM PRODUCTS FOR TAKING A SECONDARY ACTION RESPONSIVE TO RECEIPT OF AN ADVERTISEMENT

CROSS-REFERENCE TO RELATED APPLICATIONS

This is a continuation-in-part application of U.S. non-provisional application Ser. No. 10/958,813, the contents of which are incorporated by reference herein, filed Oct. 5, 2004.

BACKGROUND OF THE INVENTION

Embodiments of the invention relate generally to communications systems, and more particularly, to methods, systems, and computer program products for implementing interactive content-based activities over a network.

Continuous advancements made with respect to technologies associated with the electronics industry have resulted in significant improvements in various product features of electronics devices such as personal and desktop computers, DVD players, and stereo systems, to name a few. For example, computer manufacturers now offer increased memory capacity, faster processors, longer battery life, etc. At the same time, electronics manufacturers are continuously striving to reduce the overall size of many of these devices, without sacrificing any of these improved features, in order to satisfy the demand for portability. As with standard or traditional electronics devices, portable electronics devices such as digital music players, personal digital assistants (PDAs) or 'pocket PCs', and the like are becoming increasing popular. Accordingly, electronics manufacturers and various service providers are constantly searching for new ways to provide value to the consumers of these devices in order to gain and maintain a competitive edge over their industry counterparts.

Another area that is experiencing growth in technology is the broadcast industry. The development of new standards in broadcast communications have enabled broadcast enterprises to deliver a variety of information, both related and unrelated to a broadcast, along with the actual broadcast content (e.g., music, audio/video programming, news, etc.). As long as the broadcast-receiving device is enabled with the standard, it can receive, translate, and respond to the delivered information. For example, a display on the receiving device (e.g., car stereo) may present information relating to content (such as a song) that is currently being broadcast such as a station identification of the broadcasting station, the artist name, and the title of the song, to name a few. Additionally, information unrelated to the content being broadcast (such as advertising) may be delivered and presented. While having this additional information may be useful, the technology does not currently support interactive communications between a broadcast recipient and the sources related to the content broadcast. For example, in response to hearing a song broadcast on a recipient's receiving device, the recipient may desire to contact a source to purchase the song (e.g., via download or placing an order with a music provider) at the time of the broadcast or shortly thereafter.

It is desirable, therefore, to provide a means for enabling interactive communications between a recipient of a broadcast and a content provider or a source related to the broadcast content.

SUMMARY OF THE INVENTION

Embodiments of the invention include a method for programming a secondary device responsive to an advertisement, including: requesting a file and associated content identifier responsive to the advertisement; receiving the advertisement and a supplementary information associated with the advertisement; presenting a user with an option to initiate a request for an activity in response to the supplementary information; and performing the requested activity in response to the user request.

Other embodiments of the invention include a computer program product for recording media files from a portable storage media while playing the media file, the computer program product including: a storage medium readable by a processing circuit and storing instructions for execution by the processing circuit for facilitating a method including: requesting a file and associated content identifier responsive to the advertisement; receiving the advertisement and a supplementary information associated with the advertisement; presenting a user with an option to initiate a request for an activity in response to the supplementary information; and performing the requested activity in response to the user request.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

In accordance with exemplary embodiments, the interactive content-based activities system provides a means by which a recipient of broadcast content (also referred to herein as "broadcast") may initiate a real-time request for an item, service, or information (collectively referred to herein as "activity") that is associated with the broadcast content. Broadcast content may include music, audio/video programming, advertising, news, etc., that is transmitted via, e.g., over-the-air radio frequency (RF) signals, satellite technology, or digitally over a network, to name a few. A unique content identifier is assigned to each broadcast event or segment within a broadcast event and is transmitted together with the broadcast event. Using the content identifier, a recipient of the broadcast content may initiate a request for an activity that is related to the broadcast content. The request may be initiated during the broadcast or sometime after the broadcast has completed.

Figure 1:
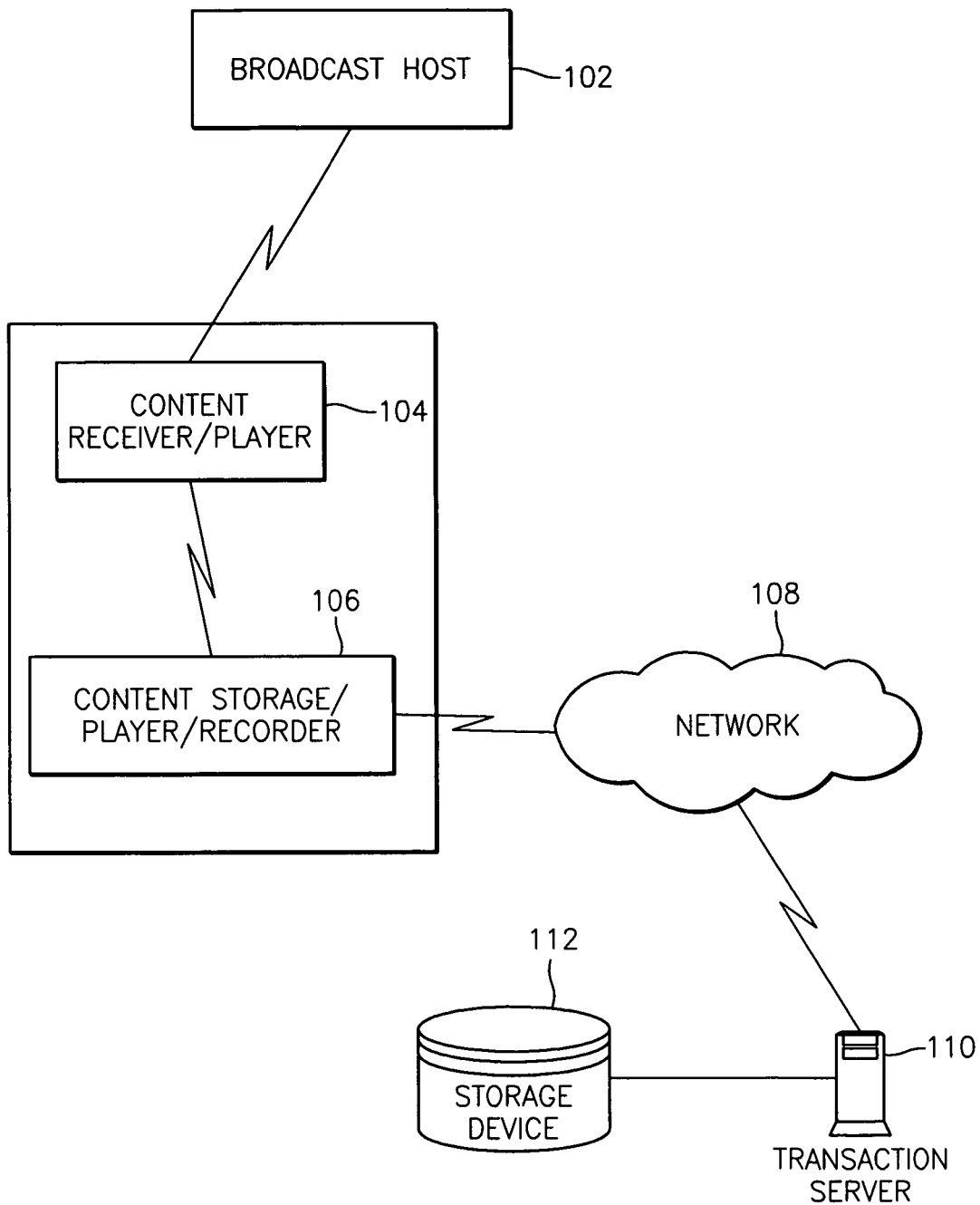
FIG. 1 is a block diagram of a system upon which interactive content-based activities may be implemented in exemplary embodiments.

Referring now to FIG. 1, a block diagram of an exemplary system for implementing interactive content-based activities is generally shown. The exemplary system of FIG. 1 includes a broadcast host system 102 in communication with a content receiver 104. Broadcast host system 102 provides broadcast content (e.g., music, programming, sports, news, advertising, etc.) to content receiver 104 via a transmissions means such as over-the-air radio frequency (RF) signals or a digital network (e.g., broadband digital subscriber line (DSL)). In addition to transmitting content, broadcast host system 102 also transmits supplementary content information in the form of digital encoded signals. The supplementary content information may include for example, the identification of the broadcast host system, the artist/composer/owner of the content, the title of the content, a content identifier that distinguishes the content from other broadcast items, or other information related to the broadcast event. Broadcast host system 102 may be a radio station or Internet radio service provider that transmits audio content, a television or other audio/video content service provider, or other similar type of content provider system. Additionally, the content that is broadcast may comprise any type of media (e.g., video, images, text, etc.).

In accordance with one embodiment, broadcast host system 102 is a broadcast radio station that transmits content via radio frequency (RF) signals. Broadcast host system 102 provides Radio Data System (RDS), Radio Broadcast Data System (RBDS), or similar type of service to its customers. For example, in addition to transmitting traditional content (e.g., music, programming, advertisements), radio stations may transmit supplementary information associated with the broadcast content in the form of encoded digital signals that are received and analyzed by an RDS/RBDS-enabled receiver. RDS/RBDS technology enables a receiver to identify the radio station it is tuned into, offers the ability to pre-select programming types from available stations (e.g., music only content), a broadcast intercept feature that provides traffic advisory information, as well as other capabilities. The RDS and RBDS specifications have been adopted by official standardization bodies such as the European Center for Electrotechnical Standardization (CENELEC) in Europe, as well as the National Radio System Committee (NRSC) of the National Association of Broadcasters® (NAB) and the Electronic Industries Association (EIA) in the United States.

In exemplary embodiments, content receiver 104 receives broadcast signals (e.g., RF, data, satellite) from broadcast host system 102, translates the signals, and presents the resulting content to a broadcast recipient. Content receiver 104 may also receive audio content from other broadcast host systems (e.g., multiple radio stations) within its range. In one embodiment, content receiver 104 is a radio that is RDS/RBDS enabled. Alternatively, the radio described above with respect to the content receiver 104 may employ a global positioning system (GPS) device. In other embodiments, content receiver is an RDS/RBDS-enabled home stereo system that receives RF signals from broadcast host system 102. Content receiver 104 converts the signals to audio signals and presents the resulting audio content to a listener as well as the supplementary data facilitated by the RDS/RBDS services. In yet further embodiments, content receiver 104 may be a television or personal computer that receives broadcast content via a network, e.g., digital subscriber line (DSL) or cable services.

In exemplary embodiments, content storage/player 106 includes an intelligent device that stores and plays recorded or downloaded content. Content storage/player 106 may communicate with content receiver 104 via a Universal Serial Bus (USB) cable or via wireless technologies, e.g., Bluetooth™ or short messaging service (SMS) or other communication mechanism. Content storage/player 106 may also include input/output controls or options as well as a user interface for implementing the interactive content-based activities as will be described further herein. It will be understood that the form of user interface may vary from one type of content device to another (e.g., voice prompts and selections via key depressions may be used on a cellular telephone, web page user interface screen for a computer user, etc.); however, in exemplary embodiments the functionality of the user interface remains the same across all content storage/player devices.

Content storage/player 106 may be a portable device that includes digital recording and playback features such as those provided by, e.g., an iPod® player by Apple Computer, Inc® of Cupertino, Calif., or an iAUDIO M3® by Cowon Systems, Inc. of Seoul, Korea. In alternate embodiments, content storage/player 106 may be a web-enabled cellular telephone, personal digital assistant (PDA), a computer, an Internet-enabled television or other media device accessible via a network.

Content storage/player 106 may store a variety of content such as digital games, pictures, and personal data (e.g., calendars, organizers, etc.). Content storage/player 106 may play recorded music in an audio format such as Moving Picture Experts Group Audio Level 3 (MP3), Advanced Streaming Format (ASF), or WAV.

In yet further embodiments, content receiver 104 and content storage/player 106 comprise a single unit. For example, together content receiver 104 and content storage/player 106 may comprise a personal computer. The personal computer receives broadcast content, e.g., Internet radio over a network. The personal computer may include software for identifying participating Internet radio stations and receive broadcast content in the form of distributed streaming audio. The computer may comprise a desktop, laptop, or other similar general-purpose computing device known in the art. The computer may include memory (e.g., removable storage media, hard disk drive) for storing information such as files, documents, images, audio, applications, and multimedia.

In exemplary embodiments, the interactive content-based activities system includes a digital rights management function. For example, the transaction server 110 may assign a Digital Rights Management (DRM) key to downloaded content that corresponds to either the content storage recorder 106 or the content receiver 104. The transaction server 110, broadcast host system 102, or the storage device 112 can control the scope of the rights transferred to the user by the use of the DRM key. In an exemplary embodiment, the broadcast host system 102 may wish to allow unlimited distribution of certain content, such as promotional or advertising materials, while restricting the duplication or distribution of other content, such as songs or movies. The broadcast host system 102 may utilize the content identifier to determine the scope of rights conveyed in the DRM key. Many other restrictions on the use of the downloaded content, such as a limit on the number of times a piece of content may be played or otherwise accessed, can be implemented through the use of the content identifier and the DRM key.

In other exemplary embodiments, the DRM key or content identifier may be transmitted from the content receiver 104 or the content storage recorder 106 to the broadcast host system 102. The broadcast host system 102 may use the re-transmitted DRM key or content identifier to track the content identifier associated with each piece of downloaded content or each file downloaded. The broadcast host system 102 will be able to collect valuable marketing data on numerous aspects of the business, such as the number of times a specific piece of content is downloaded, what time of the day the content was downloaded, and how many distinct users downloaded the content. Additionally, through the use of free downloads and other incentives the broadcast host systems 102 may be able to more accurately measure and track the listening behavior the users.

In alternative exemplary embodiments, the file or content that the user downloads includes embedded advertising materials. The broadcast host system 102 may provide content that includes permanent advertisements for download. These advertisements may be used to subsidize the cost of the license for the downloaded content or other costs. The advertisements may be related to the downloaded content, for example the advisement may be promoting an upcoming concert for the artist whose song was downloaded. The content identifier or downloaded file may include a calendar event, such as a reminder, that can be used to remind a user to tune into a show or remind the user of an upcoming event such as a concert or CD release. The Content Identifier or downloaded file may also contain a WWW URL or other associated content. In exemplary embodiments, the user is presented with an option to add the reminder to a calendar maintained by the content receiver 104.

Additionally, the broadcast host system 102 can use the interactive content-based activities system for wide range of commercial activities. For example, the broadcast host system 102 could include additional information in the content identifier that would enable a user to download additional content that is related to the broadcast content, such as different songs from the same artist or off of the same collection or playlist, or artists, genres, or collections/playlists. Optionally, the content receiver 104 or the content storage recorder 106 includes the functionality to allow the user to view or hear a program guide of upcoming broadcast content. The user may then initiate a download request before the content is actually broadcast and the content receiver 104 or the content storage recorder 106 will download the content from the storage device 112 or capture and store the broadcast content.

Also included in the exemplary system of FIG. 1 is a transaction server 110 and storage device 112. Transaction server 110 may communicate with content storage/player 106 via a network 108. Content storage/player 106 (or both of content receiver 104 and content storage/player 106 if they comprise a single unit) may communicate with transaction server 110 utilizing one or a combination of communications technologies including, e.g., satellite or cellular technology, wireless technologies, circuit-switched networking, and packet-switched networking, among others. In exemplary embodiments of the present invention, transaction server 10 operates as a database server and coordinates access to applications and data stored on the storage device 112.

The transaction server 110 depicted in the system of FIG. 1 may be implemented using one or more servers operating in response to a computer program stored in a storage medium accessible by the server 110. The transaction server 110 may operate as a network server (e.g., a web server) to communicate with requesting devices such as content storage/player 106. The transaction server 110 handles sending and receiving information to and from the content storage/player 106 and can perform associated tasks. The transaction server 10 may also include a firewall to prevent unauthorized access to the server and enforce any limitations on authorized access. For instance, an administrator may have access to the entire system and have authority to modify portions of the system. A firewall may be implemented using conventional hardware and/or software as is known in the art.

The transaction server 110 may also operate as an application server. The transaction server 10 executes one or more computer programs (i.e., an application for implementing the interactive content-based activities) to provide the functions described herein. The content storage/player 106 and the transaction server 110 may share processing by providing an application (e.g., java applet) to the content storage/player 106. Alternatively, the content storage/player 106 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

The storage device 112 includes data relating to broadcast content, supplementary information such as broadcast sources and content identifiers, as well as associated content and may be implemented using a variety of devices for storing electronic information. It is understood that the storage device 112 may be implemented using memory contained in the transaction server 110 or it may be a separate physical device. The storage device 112 is logically addressable as a consolidated data source across a distributed environment that includes network 108. Information stored in the storage device 112 may be retrieved and manipulated via the transaction server 110. Content identifiers are associated with specific broadcast content. Supplementary information that is broadcast associated with the broadcast content may include an activity identifier. Activity identifiers may indicate what type(s) of activities may be requested in response to the presentation of the broadcast content. Activities are executed in response to requests received via the corresponding activity identifiers. The following table illustrates sample content and supplemental information.

| Content_ID | CONTENT | ACTIVITY IDENTIFIER |
|---|---|---|
| MU1000893 | Song | Download Song file |
| MU1006199 | Advertisement | Purchase concert tix |
| MU6974448 | Station promotion | Enter Contest |

Referring to the example, a broadcast recipient hears a song that is received along with a corresponding content identifier "MU1000893" and activity identifier. The recipient transmits a request to server 110 that includes the content identifier and activity identifier. Exemplary Activity Identifiers may include: Download Song, Purchase Item, Enter Contest, Vote, Request More Info, Go to Website, Call Now, and Show Map. The transaction server 110 then implements the request by enabling the recipient to download the song heard in the broadcast to the content storage/player 106. Details of this process are described further in FIG. 4.

As indicated above, the system of FIG. 1 also includes a network 108. The network 108 may be any type of known network including, but not limited to, a wide area network (WAN), a local area network (LAN), a global network (e.g. Internet), a virtual private network (VPN), and an intranet. The network 108 may be implemented using a wireless network or any kind of physical network implementation known in the art.

It will be understood that other types of content storage/players (e.g., digital cameras, personal video recorders, etc.) may also be utilized in implementing the interactive content-based activities. Accordingly, the content devices described above with respect to the system of FIG. 1 are provided for illustrative purposes and are not to be construed as limiting in scope.

Figure 2:
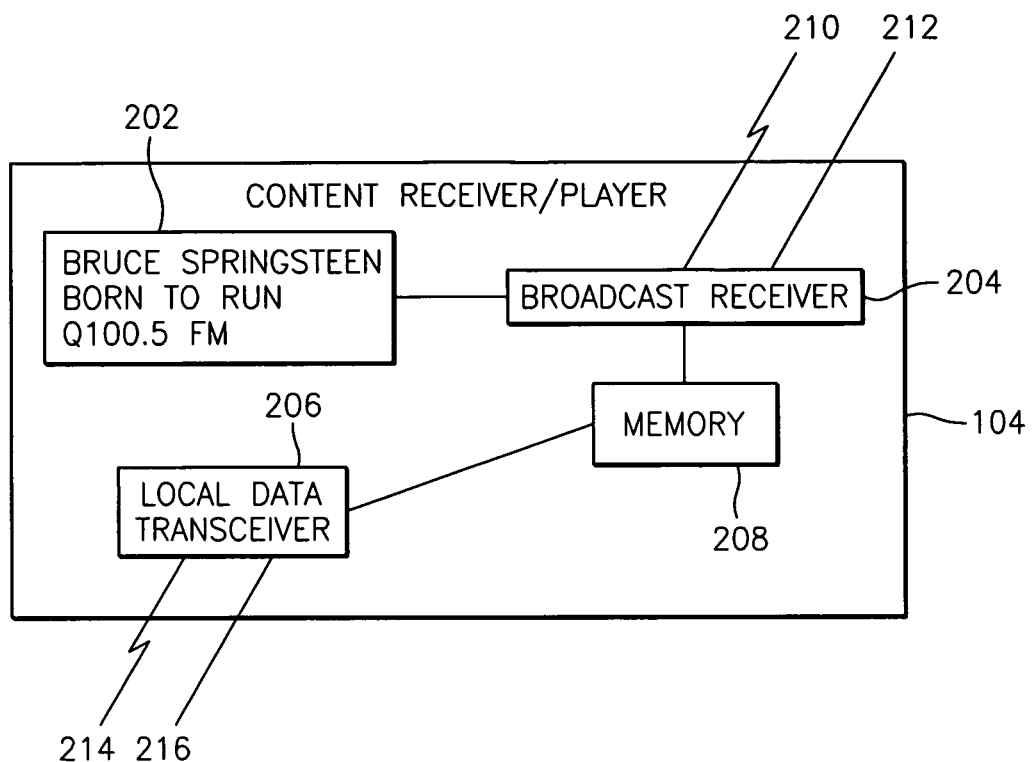
FIG. 2 is a block diagram of a content receiver and its components in exemplary embodiments.

Turning now to the block diagram of FIG. 2, an exemplary content receiver and its components will now be described. Content receiver 104 includes a display means 202 for presenting information (including supplementary information) relating to a broadcast to a recipient. A broadcast receiver 204 receives and translates broadcast signals, including the supplementary data, that are transmitted using over-the-air RF signaling means 210 or may be data signals (e.g., data packets) that are transmitted using, e.g., a packet-switched network 212. Broadcast receiver 204 then sends the translated supplemental data to the display means 202. As shown in the diagram of FIG. 2, supplementary information presented in display means 202 includes an artist name, song title, and station identification. Optionally, the content identifier of the current broadcast event may be displayed.

The content identifier of a current broadcast, as well as the activity identifier and other supplementary information, may be stored in memory 204 residing within content receiver 104. Alternatively, a log of recently broadcast content identifiers, activity identifiers, and other supplementary information may be stored in memory 208. Content receiver 104 also includes a local data transceiver 206 that communicates with content storage/player 106 via wireless means (e.g., short messaging service, Bluetooth™, etc.) 214 or may communicate with content storage/player 106 via wireline means (e.g., USB cable) 216.

Figure 3:
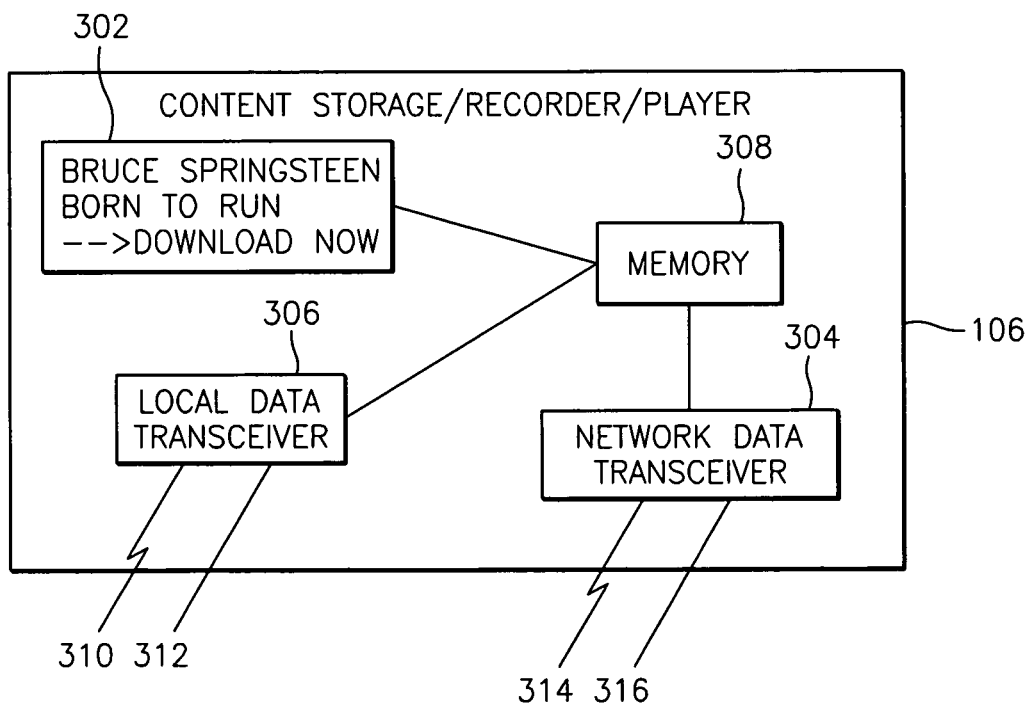
FIG. 3 is a block diagram of a content storage/player and its components in exemplary embodiments.

An exemplary diagram of a content storage/player will now be described with respect to FIG. 3. Content storage/player 106 includes a display means 302, a memory 308, a local data transceiver 306, and a network data transceiver 304. As described above, content storage/player 106 may communicate with content receiver 104 via wireless means (e.g., short messaging service, Bluetooth™, etc.) 214 or may communicate with content receiver 104 via wireline means (e.g., USB cable) 216. This communication is facilitated by the local data transceiver 306 of content storage/player 106.

Memory 308 may store content in accordance with the type of content storage/player 106 being utilized (e.g., a digital music player storing audio content, a personal computer storing video, etc.). Memory 308 may also store an executable application for implementing the interactive content-based activities described herein. Memory 308 may communicate with display 302 when a recipient initiates a request via input controls on content storage/player 106. Network data transceiver 304 communicates with transaction server 110 over a wireless network 314 or wireline network 316 similar to those described above.

Figure 4:
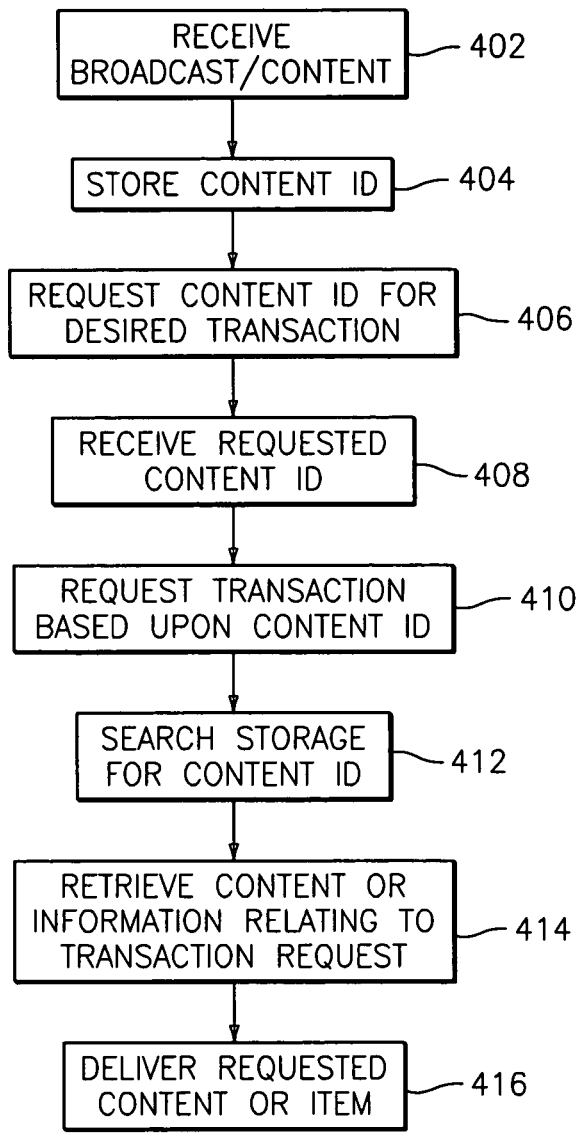
FIG. 4 is a flow diagram of a process for implementing the interactive content-based activities in exemplary embodiments.

An exemplary process for implementing the interactive content-based activities will now be described with respect to FIG. 4. For purposes of illustration, the processes described with respect to FIG. 4 refer to broadcast content consisting of music and the requested activity refers to a request to download a song file. However, it will be understood by those skilled in the art that any type of broadcast content and/or activity may be applied to the processes described herein.

At step 402, content receiver 104 from broadcast host system 102 receives a broadcast. In addition to the subject content (e.g., song), the broadcast content also includes supplementary information (e.g., the identification of the broadcast host system, the artist/composer/owner of the content, the title of the content, an activity identifier, a content identifier that distinguishes the content from other broadcast items, associated advertising or other content, a WWW URL, or other associated content) via RDS/RBDS or other technologies. Content receiver 104 stores the content identifier at step 404 and may also store a log of recent broadcasts which includes one or more of the above associated supplemental information items.

When an individual is interested in an activity associated with a broadcast, the individual selects an option on the content storage/player 106 in order to execute the activity. Upon selecting the option, the content storage/player 106 initiates a communication session with the content receiver 104 via communications means 214 or 216, requesting the current activity identifier (if the broadcast is currently underway) or may optionally request the log from the memory 208 in content receiver 104. At step 408, the individual selects the desired activity identifier from the log that is shown in the display 302 of content storage/player 106.

An offer is presented to a user to request that an activity be executed, preferably via a visual or audible prompt. For example, a request option 310 "Download Now" is shown on display 302 for selection by a recipient. Upon selecting this option, the content storage/player 106 initiates a session over network 108 via communications means 314 or 316 and contacts transaction server 110 at step 410. Transaction server 110 performs a search of storage device 112 using the content identifier as a key at step 412. The activity or item mapped to the content identifier is retrieved at step 414. Transaction server 110 responds to the request in accordance with the requirements defined for the activity. By way of the example above, the recipient downloads the requested song.

As described above, the interactive content-based activities system provides a means by which a recipient of broadcast content may initiate a real-time request for an item, service, or information that is associated with the broadcast content. Broadcast content may include a variety of media types that are transmitted over a network. A unique content identifier that is assigned to each broadcast event is transmitted along with the broadcast event and is used by a recipient to initiate a request for an activity related to the broadcast content. The request may be initiated during the broadcast or for a defined period of time after the broadcast has completed.

In exemplary embodiments, the broadcast content is an advertisement that also includes supplementary information relating to the advertisement. For example, the advertisement could be promoting a new radio show or an event such as a concert and the supplementary information would be the date and time of the show or event. Additionally, the supplementary information may include a telephone number to call for tickets or a web address that contains more information about the advertised material. The supplementary information may also be other associated content or information. The supplementary information may be broadcast via RDS/RBDS or other technologies. The content storage/player 106 may present the user with an option to store the supplementary information relating to an advertisement while the advertisement is playing and for a short period after it aired.

In the case that the advertisement is for a radio show or other broadcast content, the content storage/player 106 present the user with an option to initiate a request for an activity. The activity may include reminding them of the event or automatically play or record the broadcast. This may be accomplished by storing an event in a calendar or other application on the device or on another associated network-accessible device. Alternatively, the activity requested may be to simply store the supplementary information and allow the user to display the information at a later time. For example, the activity may be a request to store a WWW URL as a bookmark associated with a web browser application to facilitate easy access to the pertinent website at a later time.

Moreover the activity may be a request to access a WWW URL address using a web browser application at the time that the activity request is made. Further, the activity may be a request to place an advertised item in an electronic shopping cart for future purchase processing. The activity may also be a request to place a telephone call using a telephony application on the device, wherein the destination telephone number is included in the supplementary information. The activity may also be a request to display a map on the device associated with a destination location associated with the content. Optionally, directions from the device to the destination location may be generated and displayed using GPS information that indicated the current location of the device. Further, the content storage/player 106 may include the capability to transfer the supplementary information to an auxiliary device such as a PDA or cellular telephone via a wired or wireless connection. Optionally, the content storage/player 106 may initiate a request associated with the supplementary information. The request may include a request to download advertised content, a request to execute an electronic purchase, or a request to receive more information relating to the advertised material.

Figure 5:
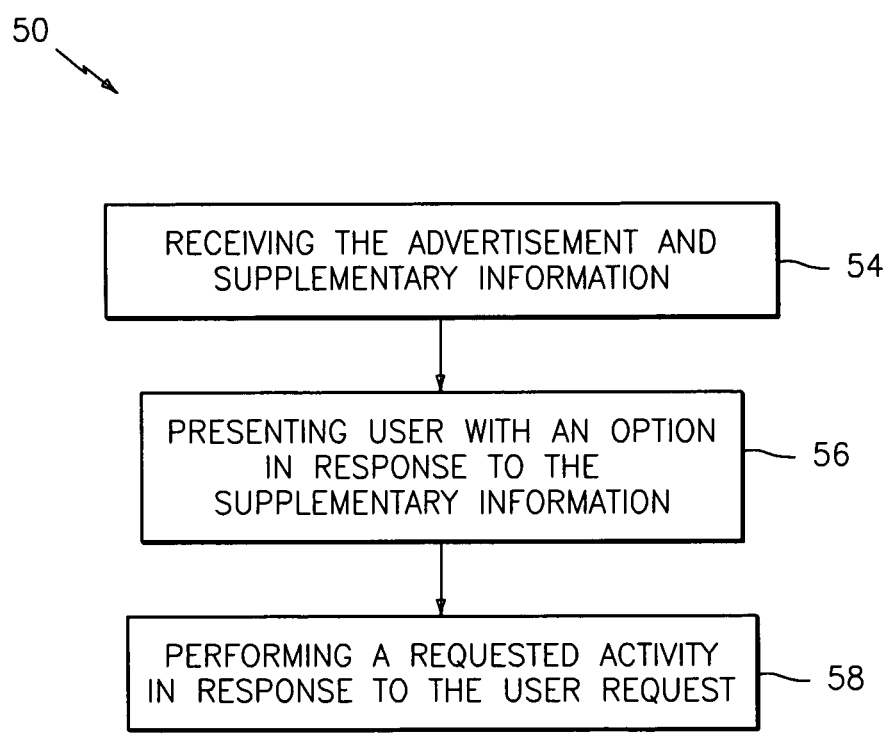
FIG. 5 is a flow diagram of a process for implementing the method for programming a secondary device responsive to an advertisement in exemplary embodiments.

Turning now to FIG. 5, a flow diagram of an exemplary embodiment of a process for implementing the method for programming a secondary device responsive to an advertisement in depicted generally as 50. As shown at process block 54, the method for programming a secondary device responsive to an advertisement 50 includes receiving the advertisement and supplementary information. After receiving the advertisement and supplementary information the method for programming a secondary device responsive to an advertisement 50 presents user with an option in response to the supplementary information, as shown at process block 56. The method for programming a secondary device responsive to an advertisement 50 further includes performing a requested activity in response to the user request, as shown at process block 58.

The ability to store the supplementary information from an advertisement allows a user to quickly store the desired information with out having to manually record the information. In the case or a car stereo and a radio advertisement, a substantial risk of distraction while driving may be avoided.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method comprising:
receiving, by a vehicle radio, an advertisement and supplementary information associated with the advertisement;
receiving, by the vehicle radio, from a radio broadcast host system, a content identifier exclusively associated with the advertisement, the content identifier comprising an alphanumeric identification that distinguishes the advertisement from other advertisements having other content identifiers;
wherein both the advertisement and the content identifier exclusively associated with the advertisement are received together from the radio broadcast host system;
wherein the supplementary information includes:
an identification of the radio broadcast host system,
an artist name, a composer, a song title, and an owner of content,
a station identifier,
call letters and frequency of a radio station,
a web address, and
an activity identifier related to a secondary activity, the activity identifier indicating what type of the secondary activity can be requested for the content identifier;
wherein the content identifier is distinct and different from the supplementary information;
presenting, by the vehicle radio, an audio prompt to a user as one option to initiate a request from the user to execute the secondary activity in response to detecting the activity identifier included in the supplementary information, the request comprising the content identifier and the activity identifier;
transmitting, by the vehicle radio, to an external server, the request comprising the content identifier and the activity identifier, wherein the external server can implement the request for the activity identifier upon selection to execute the secondary activity on the vehicle radio;
storing, by the vehicle radio, a calendar;
if the secondary activity is related to a reminder, obtaining, by the vehicle radio, a calendar event as the reminder for an upcoming music release and for tuning into a show, and presenting, by the vehicle radio, an option to add the calendar event as the reminder in the calendar stored in the vehicle radio;
if the secondary activity is related to a download, in response to presenting to the user an audible program guide of an upcoming broadcast content, initiating a download request before the upcoming broadcast content is actually broadcast; and
performing, by the vehicle radio, the secondary activity according to the request from the user, wherein performing the secondary activity comprises:
programming a secondary device to automatically play a broadcast content,
saving a uniform resource locator address as a bookmark for use by a web browser,
displaying a website as identified by the uniform resource locator address,
executing an electronic purchase, and saving data to an electronic shopping cart for execution of a future electronic purchase.

2. The method of claim 1, wherein the secondary activity includes storing the supplementary information on a storage device;
 wherein the content identifier is stored in a table, such that the table comprises the other content identifiers above and below the content identifier;
 wherein the alphanumeric identification for the content identifier associated with the advertisement includes same alphabets as but different numerals than the other content identifiers above and below the content identifier.

3. The method of claim 1, wherein the secondary activity includes programming the secondary device to automatically record the broadcast content, by saving an event to a calendar application, the calendar application being maintained by the secondary device.

4. The method of claim 1, further comprising;
 presenting the user with an option to store the supplementary information associated with the advertisement while the advertisement is airing;
 presenting the user with an option to store the supplementary information for a period after the advertisement has aired; and
 displaying, by the vehicle radio, the content identifier.

5. The method of claim 1, wherein the supplementary information is broadcast via a radio descriptive service, and a radio broadcast descriptive service.

6. A computer program product of a vehicle radio, the computer program product comprising:
 a processing circuit; and
 a non-transitory storage medium readable by the processing circuit and storing instructions that, when executed by the processing circuit, cause the processing circuit to perform operations:
 receiving, by the vehicle radio, the advertisement and supplementary information associated with the advertisement;
 receiving, by the vehicle radio, from a radio broadcast host system, a content identifier exclusively associated with the advertisement, the content identifier comprising an alphanumeric identification that distinguishes the advertisement from other advertisements having other content identifiers;
 wherein both the advertisement and the content identifier exclusively associated with the advertisement are received together from the radio broadcast host system;
 wherein the supplementary information includes:
 an identification of the radio broadcast host system,
 an artist name, a composer, a song title, and an owner of content,
 a station identifier,
 call letters and frequency of a radio station,
 a web address, and
 an activity identifier related to a secondary activity, the activity identifier indicating what type of the secondary activity can be requested for the content identifier;
 wherein the content identifier is distinct and different from the supplementary information;
 presenting, by the vehicle radio, an audio prompt to a user as one option to initiate a request from the user to execute the secondary activity in response to detecting the activity identifier included in the supplementary information, the request comprising the content identifier and the activity identifier;
 transmitting, by the vehicle radio, to an external server, the request comprising the content identifier and the activity identifier, wherein the external server can implement the request for the activity identifier upon selection to execute the secondary activity on the vehicle radio;
 storing, by the vehicle radio, a calendar;
 if the secondary activity is related to a reminder, obtaining, by the vehicle radio, a calendar event as the reminder for an upcoming music release and for tuning into a show, and presenting, by the vehicle radio, an option to add the calendar event as the reminder in the calendar stored in the vehicle radio;
 if the secondary activity is related to a download, in response to presenting to the user an audible program guide of an upcoming broadcast content, initiating a download request before the upcoming broadcast content is actually broadcast; and
 performing, by the vehicle radio, the secondary activity according to the request from the user, wherein performing the secondary activity comprises:
 programming a secondary device to automatically play a broadcast content,
 saving a uniform resource locator address as a bookmark for use by a web browser,
 displaying a website as identified by the uniform resource locator address,
 executing an electronic purchase, and
 saving data to an electronic shopping cart for execution of a future electronic purchase.

7. The computer program product of claim 6, wherein the secondary activity includes storing the supplementary information on a storage device.

8. The computer program product of claim 6, wherein the secondary activity includes programming the secondary device to automatically play the broadcast content.

9. The computer program product of claim 6, wherein the operations further comprise transferring the supplementary information to an auxiliary device.

10. The computer program product of claim 6, wherein the supplementary information is broadcast via a radio descriptive service and a radio broadcast descriptive service.

* * * * *